United States Patent [19]

Steckler et al.

[11] 4,250,525
[45] Feb. 10, 1981

[54] TELEVISION HORIZONTAL AFPC WITH PHASE DETECTOR DRIVEN AT TWICE THE HORIZONTAL FREQUENCY

[75] Inventors: Steven A. Steckler, Clark; Alvin R. Balaban, Lebanon, both of N.J.

[73] Assignee: RCA Corporation, New York, N.Y.

[21] Appl. No.: 37,380

[22] Filed: May 9, 1979

[51] Int. Cl.³ .............................................. H04N 5/04
[52] U.S. Cl. ................................ 358/148; 358/155; 358/158
[58] Field of Search ............... 358/148, 155, 158, 159; 331/18, 20; 328/165

[56] References Cited

U.S. PATENT DOCUMENTS

| | | | |
|---|---|---|---|
| 3,688,037 | 8/1972 | Ipri | 358/158 |
| 3,846,584 | 11/1974 | Itoh | 358/158 |
| 3,906,155 | 9/1975 | Van Straaten | 358/158 |
| 3,935,388 | 1/1976 | Brinkmann | 358/158 |
| 4,093,963 | 6/1978 | Uchida | 358/158 |
| 4,144,544 | 3/1979 | Fernsler | 358/158 |
| 4,144,545 | 3/1979 | Fernsler | 358/158 |

Primary Examiner—Robert L. Griffin
Assistant Examiner—Michael A. Masinick
Attorney, Agent, or Firm—Eugene M. Whitacre; William H. Meise; W. Brinton Yorks, Jr.

[57] ABSTRACT

An AFPC loop for TV horizontal oscillator suitable for use with sync signals subject to timing instability includes means for maintaining a long response time during the equalizing and vertical sync intervals to reduce drift, and shortens the loop response time after the second equalizing pulse interval for maximum correction.

9 Claims, 5 Drawing Figures

TELEVISION HORIZONTAL AFPC WITH PHASE DETECTOR DRIVEN AT TWICE THE HORIZONTAL FREQUENCY

BACKGROUND OF THE INVENTION

This invention relates to a television horizontal automatic frequency and phase control (AFPC) loop in which the loop gain is periodically increased during the vertical deflection cycle in order to compensate for errors occurring just before or during the vertical blanking interval.

Television displays are generated by repetitively scanning an electron beam over the surface of a picture tube viewing screen to form a lighted raster area. The picture tube electron beam intensity is modulated by video signals to form images on the screen representative of the picture to be displayed. Conventional television provides a high-speed horizontal scanning in conjunction with a relatively low-speed vertical scanning. The scanning in the vertical and horizontal directions is synchronized with synchronizing (sync) signals included in a composite video signal with the video signal to be displayed. The sync signals are extracted from the composite video, and the sync signals thus extracted are used to synchronize the vertical and horizontal-direction scanning apparatus.

A sync separator for separating the horizontal synchronizing signal from the composite video includes a differentiating circuit and a threshold circuit. The differentiating circuit selectively couples signals at and above the horizontal synchronizing frequency to the threshold circuit. The threshold circuit responds to the high-frequency higher-amplitude sync signal portions of the composite video to produce a sequence of sync pulses.

The vertical synchronizing signals contained in the composite video signal are high-amplitude pulses having low-frequency components. The vertical sync signal proper has a duration of three horizontal lines. In order to maintain the flow of horizontal sync information during the vertical synchronizing interval, the vertical synchronizing pulse includes serrations by which the horizontal oscillator may be synchronized. In the NTSC television system, vertical scanning of an image is accomplished during two successive field intervals, the horizontal scanning lines of which are interlaced. Interlacing requires that the horizontal oscillator frequency be maintained in an exact relationship with the vertical frequency. In order to help the vertical sync separator maintain exact timing in extracting the vertical sync pulses, equalizing pulses are provided in the composite video during a period of three horizontal lines preceding and following the vertical synchronizing intervals. The equalizing pulses recur at twice the rate of the horizontal sync pulses. The serrations during the vertical synchronizing pulse interval also recur at twice the rate of the horizontal sync pulses.

In television systems in which the composite video signals are modulated onto a carrier and broadcast, many of the television receivers are in areas far from the transmitting station, where a weak signal can be expected. Due to the presence of unavoidable thermal noise, and also due to various forms of interference signals which may occur in the vicinity of the receiver, it may be expected that the composite video as received and the synchronizing signals derived therefrom will be intermingled with electrical noise. This electrical noise is manifested as random variation of the desired signal amplitude, and can severely perturb the operation of the display device. Commonly, noise synchronization causes vertical and horizontal jitter, or in more extreme forms "rolling" or "tearing" of the image displayed on the raster. As transmitted, the synchronizing signal pulses recur at a rate which is carefully controlled and extremely stable. Since the presence of noise obscures the synchronizing signals in a random manner, it has become common practice to obtain synchronization of the horizontal deflection circuit with the horizontal synchronizing pulse signal by the use of an oscillator, the free-running frequency of which is near the horizontal scanning frequency, and the exact frequency and phase of which is controlled in an indirect manner by a phase-lock loop (PLL) to equal the synchronizing signal frequency and phase. Thus, when any one synchronizing pulse is obscured by noise, the rate of the oscillator remains substantially unchanged, and the deflection circuits continue to receive regular deflection control pulses. Random variations in the apparent arrival time of the sync signals are averaged by the PLL loop filter, so the deflection control pulses remain in close synchronism with the video signals.

Since the PLL is a feedback system, there is an undesirable residual phase error between the oscillator signal and the synchronizing signal. High loop gain is desirable in order to minimize error, but due to imperfections in the loop components, the loop then becomes more responsive to perturbing noise. This can be offset by reducing the closed-loop bandwidth of the PLL, which may undesirably reduce transient response time. Thus, a compromise between loop gain and bandwidth is often necessary.

With the advent of integrated circuits for low-power signal processing in television devices, it has become convenient in a PLL to compare the horizontal synchronizing signals from the sync separator with a square wave as produced by the controlled horizontal oscillator rather than with a sawtooth signal. During the synchronizing pulse interval, the PLL phase detector gates a first current source which charges a storage capacitor in a first polarity when the oscillator square wave output is high, and which turns off the first current source and turns on a second current source poled to discharge the capacitor when the oscillator output is low. Thus, when the transition time of the square-wave oscillator output is centered on the synchronizing pulse, the charging and discharging currents are equal and the net capacitor voltage does not change. This maintains the oscillator frequency constant.

With the described type of phase detector, the phase detector gain and therefore the loop gain of the PLL may decrease during the equalizing and synchronizing pulse intervals. Such a decrease in gain of the PLL may be disadvantageous when rapid slewing of the horizontal oscillator frequency or phase is required during the vertical blanking interval. This may be the case, for example, when the television receiver is to be used to display information which has been recorded on a home-type video tape recorder. Such tape recorders often have a plurality of reproduction heads, each of which is mechanically scanned across the tape. In one common scheme, two heads are used, which alternately scan the tape for a duration equal to that of a vertical field. In order to avoid loss of, or breaks in the displayed information, scanning of the succeeding field is commenced by the second head substantially concurrently with the end of scanning in the first head. However, slight differences in tape tension or in the dimensions of the mechanical tape transport acting on the tape for playback compared with the tension and dimensions when the tape was recorded results in differences in the time between succeeding horizontal synchronizing pulses in the information as recorded as compared with playback, especially during the switchover between heads. This results in a discontinuity or step change in the phase of the horizontal synchronizing pulses available for synchronizing the horizontal oscillator, which step normally occurs about five horizontal lines before the end of a vertical scanning interval and the beginning of the vertical blanking interval. A high oscillator slew rate during the vertical blanking interval is necessary to conform the horizontal oscillator phase to the synchronizing signal phase after the step change, and this conformance must be complete before scanning begins for the next succeeding field.

It is known from U.S. Pat. No. 3,846,584 issued Nov. 5, 1974 to Itoh to disconnect the loop filter from the PLL for an interval immediately following the appearance of the vertical sync signal, but a decrease in PLL gain during the equalizing and vertical synchronizing pulse intervals as may be occasioned by the presence of equalizing pulses or serrations may prevent rapid slewing of the horizontal oscillator and therefore prevent accommodation of such a step change. This may result at the top of the raster in an apparent bending or tearing of vertical lines in the displayed image. Even when the synchronizing signals associated with the video to be displayed do not have a step change in phase, the decrease in PLL gain during the equalizing and vertical synchronizing pulse intervals may be disadvantageous. This may occur, for example, in those cases in which the first and second gated current sources in the described type of phase detector have unequal amplitudes. Unequal charge and discharge currents results in a progressive change in the horizontal oscillator control signal and may result in driving the oscillator off-frequency during the equalizing and vertical synchronizing intervals in which the PLL gain is low. If the loop gain is increased during this interval as suggested by Itoh, the oscillator may drift off-frequency very quickly, and there may then be insufficient time remaining before the beginning of the next following scanning interval for correction, resulting in an apparent bending or tearing of vertical lines in the displayed image.

SUMMARY OF THE INVENTION

An improved television horizontal oscillator synchronizing arrangement for use with composite television signals including horizontal synchronizing signal portions and also including synchronizing pulses at twice the horizontal rate during a first portion of the vertical blanking interval includes a synchronizing signal separator adapted to receive the composite television signals for producing first horizontal rate signals. A phase detector has an input terminal coupled to the synchronizing signal separator. A controllable oscillator produces second horizontal-rate signals which are coupled to a second input of the phase detector so the phase detector can produce a pulsating control signal representative of the frequency and phase difference between the separated synchronizing signals from the synchronizing signal separator and the second horizontal rate signals from the controllable oscillator. A controllable filter couples the output terminal of the phase detector to a rate control input terminal of the controllable oscillator for closing a feedback phase-lock control loop and for filtering the pulsating output signal of the phase detector to maintain the oscillator output signals in synchronism with the separated synchronizing signals. The controllable filter has a control input terminal by which the time constant of the filter can be varied in order to vary the speed with which phase synchronism can be achieved in the feedback loop. A control arrangement is coupled to the control input terminal of the filter for changing the filter time constant at the vertical rate. The control circuit includes a timing arrangement for inhibiting the control circuit during at least a portion of the blanking interval in which pulses occur at twice the horizontal rate.

DESCRIPTION OF THE INVENTION

Figure 1:
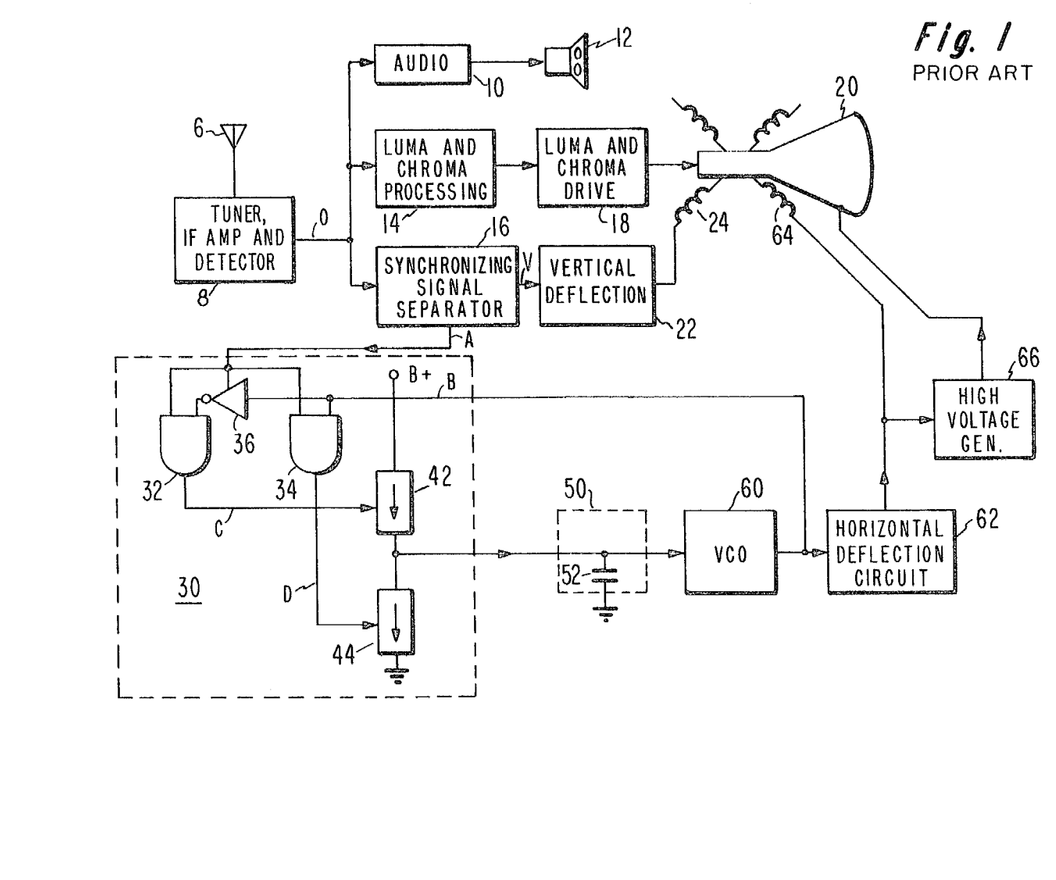
FIG. 1 illustrates in block and schematic diagram form a television receiver including an AFPC loop according to the prior art.

In FIG. 1, a television receiver includes an antenna 6 for receiving broadcast television signals. Antenna 6 is coupled to a tuner, intermediate-frequency (IF) amplifier and video detector illustrated together as a block 8, for producing composite video which is coupled by way of a conductor O to an audio signal processing circuit illustrated as a block 10 and thence to a speaker 12, to luminance and chrominance processing circuits illustrated as a block 14, and also to a synchronizing signal separator illustrated as a block 16. The luminance and chrominance information generated by processing circuits 14 is coupled to a kinescope 20 by means of appropriate luminance and chrominance drive circuits illustrated as a block 18.

Synchronizing signal separator 16 separates the vertical synchronizing signals from the composite video and couples them by way of a conductor V to a vertical deflection circuit illustrated as a block 22. Deflection circuit 22 produces recurrent sawtooth current drive signals which are applied in synchronism with the vertical synchronizing signals to vertical deflection windings 24 associated with kinescope 20.

Synchronizing signal separator 16 also separates the horizontal synchronizing signals from the composite video and applies them by way of a conductor A to a phase detector designated generally as 30. Phase detector 30 includes first and second AND gates 32 and 34, respectively, each having an input coupled to conductor A. A loop filter 50 includes a filter capacitor 52 which has one end connected to ground and which receives charging current from B+ through a gated current source 42. A second gated current source 44 is coupled in parallel with capacitor 52 for discharging the capacitor. Gated current source 42 is controlled by the output of AND gate 32 and gated current source 44 is controlled by the output of AND gate 34. The voltage across capacitor 52 is the filtered output of phase comparator 30. This output is coupled to a frequency-controllable horizontal oscillator (VCO) illustrated as a block 60. Oscillator 60 produces output signals which are coupled to the input of a horizontal deflection circuit 62. Deflection circuit 62 produces horizontal deflection current under the control of oscillator 60. The deflection current is coupled to horizontal deflection windings illustrated as 64 associated with kinescope 20. Horizontal deflection circuit 62 also drives a high voltage generator illustrated as 66 which produces a direct ultor voltage for energizing the kinescope.

The output of horizontal oscillator 60 is also applied by way of a conductor B to a second input of AND 34 and, by way of an inverter 36, to a second input of AND 32.

In operation, the tuner of FIG. 1 selects a broadcast carrier signal, mixes it to an IF frequency, amplifies and detects it to produce a composite video representative of the information in the selected broadcast signal. The color and luminance portions of the composite video are coupled to the control elements of the kinescope by processing circuits 14 and drive circuits 18 as mentioned and the vertical synchronizing signals separated by separator 16 control the vertical deflection.

Figure 2:
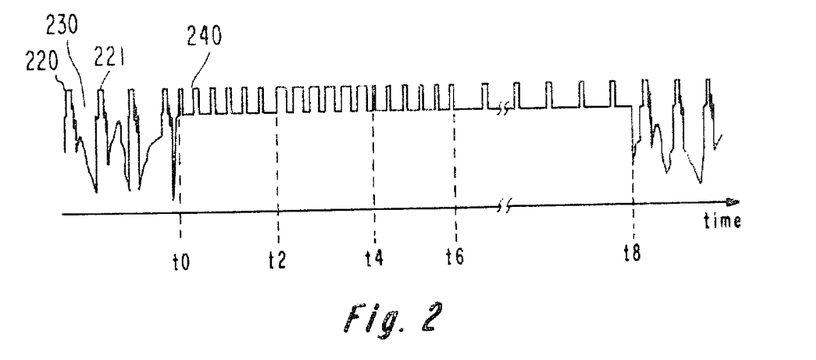
FIGS. 2 and 3 illustrate as amplitude-time diagrams certain voltage and current waveforms illustrating the operation of the arrangement of FIG. 1.

An amplitude-time plot of the composite video on conductor O near the vertical blanking interval is illustrated in FIG. 2. The vertical blanking interval extends from time T0 at which the vertical blanking interval begins to time T8, and has a duration approximately equal to that of 19 horizontal lines. The vertical scanning interval before time T0 and extending from time T8 to the next following time T0 contains video information and horizontal synchronizing signals. The horizontal synchronizing signals such as pulses 220, 221 are separated by interstices such as 230 which contain the video information at a lower amplitude than the synchronizing pulses.

The vertical synchronizing information in the composite video illustrated in FIG. 2 occurs in the interval between times T2 and T4 of the vertical blanking interval. During intervals T2-T4, six wide pulses separated by five serrations allow the RC integrator portion (not shown) of the synchronizing signal separator to charge to a threshold. Because of the half-horizontal line difference in the starting time of each successive vertical field, the horizontal synchronizing pulses such as 220, 221 if carried through the interval T0-T2 would cause the RC integrator to assume slightly different charges in successive fields at time T2 at which the synchronizing interval begins. This might cause recurrent changes in the triggering of the synchronizing signal separator threshold device and might result in erratic interlace. In order to avoid this problem, the composite video in time T0-T2 includes equalizing pulses such as 240, which recur at twice the horizontal rate. Thus, there is no difference in the interval T0-T2 preceding the vertical synchronizing interval between an even field and an odd field, and the charge on the RC integrator at time T2 tends to remain constant.

Figure 3:
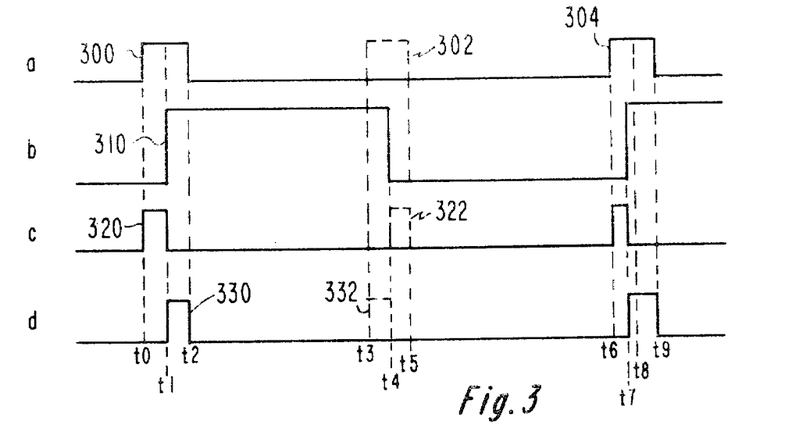

In operation during the vertical scanning interval, sync signal separator 16 produces on conductor A synchronizing signal pulses illustrated by the solid-line waveform in FIG. 3a. Pulse 300 has a duration from time T0 to time T2, which substantially coincides with the time of a horizontal pulse 220 illustrated in FIG. 2. The PLL responds to the pulses, and oscillator 60 produces at its output a recurrent square wave illustrated as 310 in FIG. 3b, which square wave has a transition centered at a time T1 between times T0 and T2. AND gates 32 and 34 are enabled to respond to the signals at their second inputs when a sync pulse such as 300 is produced on conductor A. Thus, gates 32 and 34 are enabled for conduction in the interval T0-T2. In the interval T0-T1 when square wave 310 is low, inverter 36 applies a high signal to the second input of gate 32, producing at the output of gate 32 a current source gating pulse illustrated as 320 in FIG. 3c. Current source 42 responds with a current pulse which charges capacitor 52, which current pulse may also be illustrated by pulse 320.

In the interval T1-T2, both sync pulse 300 and square wave 310 are high, which enables gate 34 to produce a gating pulse illustrated as 330 in FIG. 3d. With square wave 310 high, inverter 36 drives an input of gate 32 low and gating pulse 320 produced by AND 32 ends. Thus, in the interval T1-T2 charging current source 42 does not conduct and discharging current source 44 conducts. So long as time T1 at which the transition of square wave 310 occurs remains centered in the interval T0-T2, gating pulses 320 and 330 will have equal duration, and gates 32 and 34 conduct alternately. If current sources 42 and 44 have equal magnitude, zero net change in charge on capacitor 52 results.

If, as illustrated in the interval T6-T9, the phase of oscillator square wave output signal 310 deviates, the transition of the square wave occurs at a time T7 which is not at time T8 centered in the interval T6-T9. This results in charging current pulse 320 and discharging current pulse 330 having different durations, and will cause a net change in the capacitor voltage, whereby the frequency and phase of horizontal oscillator 60 are slewed in a feedback manner to maintain the transition centered on the synchronizing pulse.

During the vertical synchronizing and equalizing pulse intervals T0-T6 as illustrated in FIG. 2, the high-frequency high-amplitude equalizing pulses and the serrations at twice the horizontal rate cause a double-rate response of synchronizing signal separator 16. Thus, in addition to pulses 300, 304 as illustrated in FIG. 3a, additional interstitial pulses such as 302 are produced on conductor A. The effect of an additional pulse 302 in the interval T3-T5 is to enable gates 32 and 34 for conduction. Square wave 310 may have a transition in this interval, as illustrated by FIG. 3b. In the interval T3-T4, pulse 302 and square wave 310 enable discharging current source 44 to produce a further discharging current illustrated as 332, and in the interval T4-T5 produce a gating pulse such as 322 which enables charging current source 42. The result of this additional response during the vertical synchronizing and equalizing pulse intervals is to render the phase detector relatively unresponsive to changes in phase.

As mentioned, lack of response to phase changes corresponds to a low-gain condition of the phase detector, which is particularly disadvantageous when the PLL must operate upon the video signals produced by a tape recorder wherein the oscillator must slew at a high rate at some time near the vertical blanking interval. Moreover, the low PLL gain may allow the oscillator to slew away from the correct phase even when there is no step change in the phase of the input signal. This can happen, for example, if current sources 42 and 44 are not perfectly matched in amplitude. There will be a net unbalance in current which will change the charge on capacitor 52 and result in oscillator slewing, and the PLL may have insufficient gain to significantly correct the error.

Figure 4:
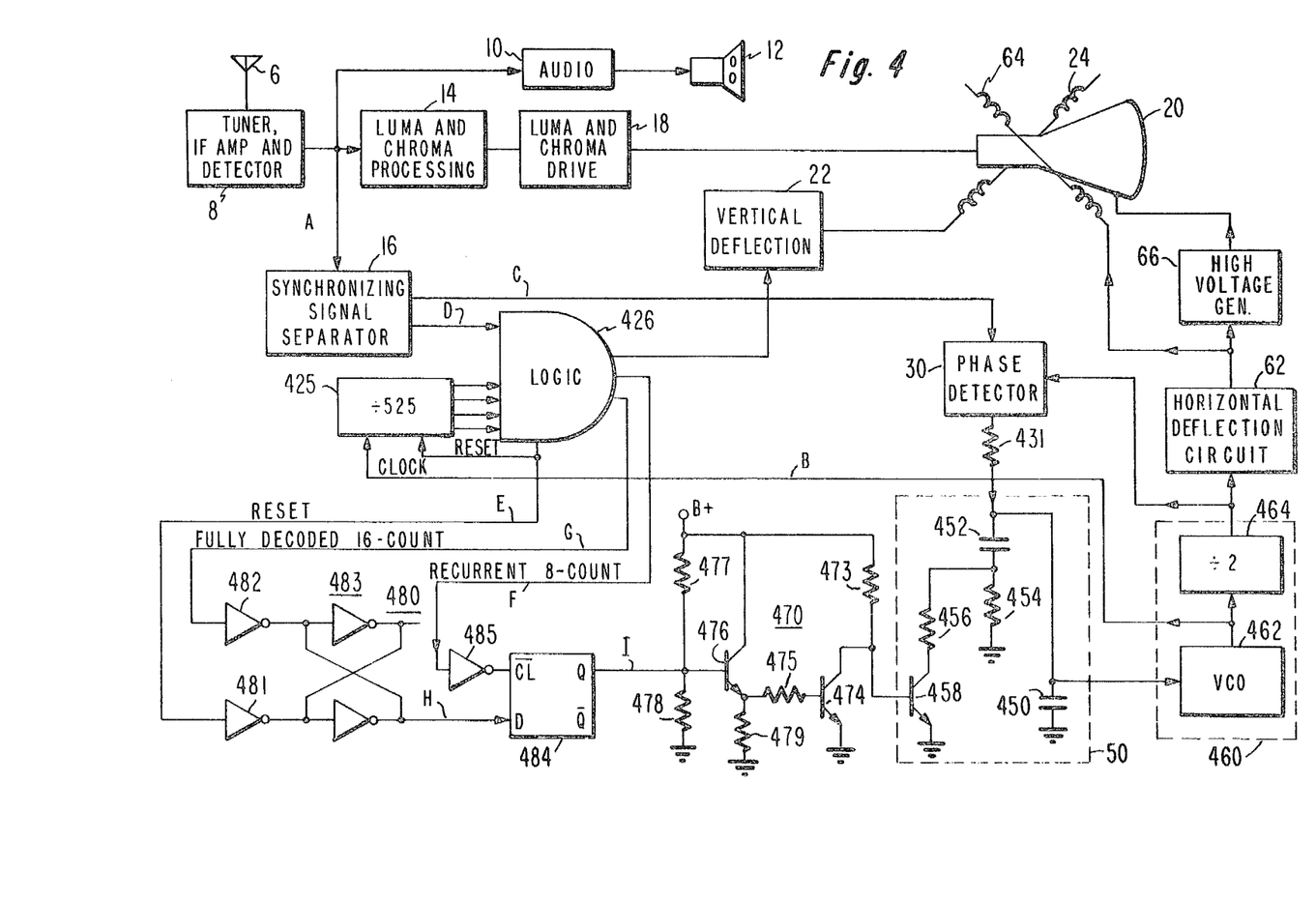
FIG. 4 is a block diagram of a television receiver embodying the invention.
Figure 5:
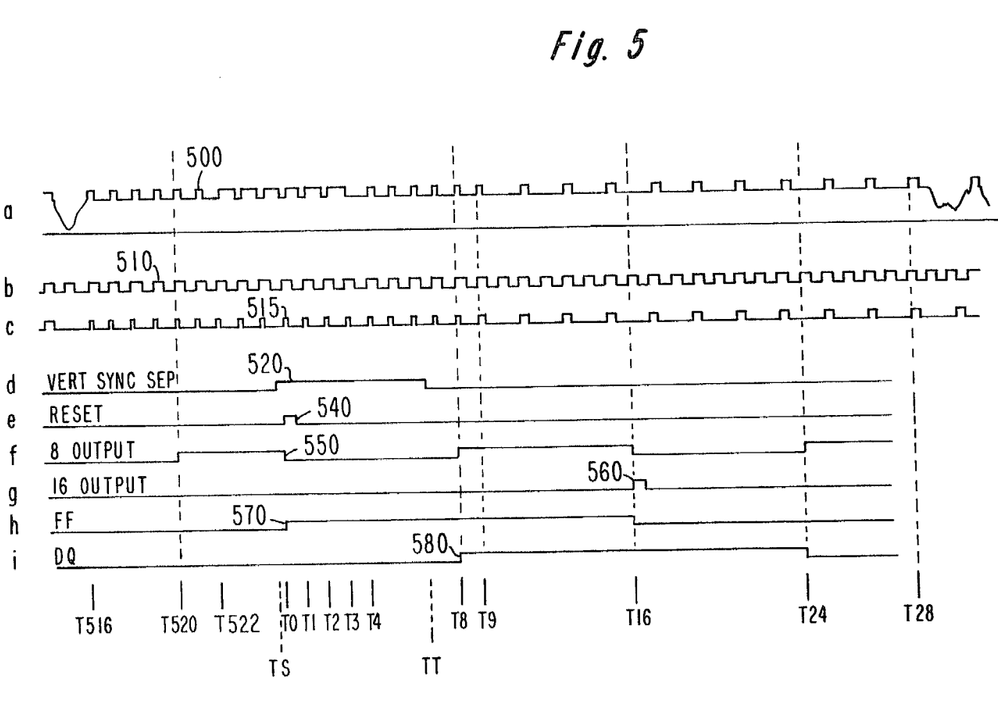
FIG. 5 illustrates as amplitude-time plots a timing diagram illustrating the operation of the arrangement of FIG. 4.

In FIG. 4, those elements corresponding to elements of FIG. 1 are given the same reference numerals. In FIG. 4, phase detector 30 is coupled by a resistor 431 to a loop filter 50 which includes a capacitor 450 and also includes the series combination of a capacitor 452 and a resistor 454 coupled across capacitor 450. Resistor 431 represents the output impedance of phase detector 30. The filtered output of loop filter 50 is applied to a controllable oscillator designated generally as 460 and including a voltage control oscillator 462 which produces signals at twice the horizontal frequency (2fH). The 2fH output of VCO 462 is applied to a divide-by-two circuit 464 to produce horizontal frequency (fH) signals at the output of control oscillator 460, as is known from U.S. Pat. No. 3,906,155 issued Sept. 16, 1975 to Van Straaten. The fH output of oscillator 460 is applied to a second input of phase detector 30 to close a feedback loop by which both the 2fH output of VCO 462 and the fH output of controlled oscillator 460 are maintained in a controlled phase relation with separated horizontal sync signals on conductor C. The separated sync signals on conductor C are illustrated as 515 in FIG. 5c. The fH output of oscillator 460 is applied to horizontal deflection circuit 62 for controlling the deflection, as described in conjunction with FIG. 1.

The 2fH output of oscillator 460 is applied as a clock signal to a divide-by-525 counter 425 of a vertical count-down arrangement. The 2fH clock signal is illustrated as 510 in FIG. 5b. The vertical count-down arrangement includes a logic circuit 426 which responds to the various states of counter 425 and to vertical synchronizing pulses from separator 16 to produce a vertical drive signal for vertical deflection circuit 22. Such a vertical count-down arrangement compensates for the excessive noise sensitivity of the sync separator by excluding from the vertical deflection timing all separated sync signals except those positively identified as vertical sync signals, and supplies counter-produced vertical-rate sync signals to deflection circuit 22 continuously, regardless of the presence of absence of identifiable sync from separator 16. Such vertical count-down arrangements are described in U.S. Pat. No. 3,688,037 issued Aug. 29, 1972 to Ipri and in the aforementioned Van Straaten patent. Additional recurring counter outputs may be obtained from counter 425, and fully decoded outputs (those occurring only once at a particular count of each complete counter cycle) may be obtained in known manner by means of logic circuit 426.

Loop filter 50 is made controllable by a resistor 456 and a transistor 458 coupled across resistor 454, driven by a drive circuit designated generally as 470. The variable loop filter arrangement is similar to that described in U.S. Pat. No. 4,144,545 issued Mar. 13, 1979 in the name of Fernsler, et al. When transistor 458 is conductive, resistor 454 is paralleled by resistor 456, and the phase control loop responds slowly. When transistor 458 is nonconductive, the PLL responds quickly.

The base of transistor 458 is connected to an inverting transistor stage including a resistor 473 connected to a source B+ of operating potential and also including an NPN transistor 474. The base of transistor 474 is coupled through an isolating resistor 475 to an emitter follower including an NPN transistor 476, the emitter of which is coupled to ground by a resistor 479. Quiescent base bias for transistor 476 is supplied by a voltage divider consisting of resistors 477 and 478 coupled between B+ and ground.

A filter time constant control arrangement designated generally as 480 receives timing signals from the vertical count-down circuit over conductors, E, F and G, and produces time constant control signals which are applied to filter drive circuit 470 over a conductor I. Counter reset pulses illustrated as 540 in FIG. 5 are coupled from logic circuit 426 to the input of an inverter 481 of control circuit 480 over a conductor E. A fully decoded signal illustrated as 560 of FIG. 5g and representative of a 16-count from counter 425 is coupled over a conductor G to the input of an inverter 482. Each of the outputs of inverters 481 and 482 is coupled to an input of a cross-coupled flip-flop (FF) designated generally as 483. The output of FF 483 is coupled to the data (D) input of a D-type FF 484 by a conductor H. A repetitive 8-count signal illustrated as 550 in FIG. 5f is coupled from logic circuit 426 to the input of an inverter 485 by way of a conductor F. The output of inverter 485 is coupled to the $\overline{\text{clock}}$ (inverted clock) input of FF 484. The Q output of FF 484 is coupled to the base of transistor 476 by conductor I. The filter time constant control signal on conductor I is illustrated as 580 in FIG. 5a.

The composite video signal applied to sync separator 16 by way of conductor A during a time interval including the vertical blanking interval is illustrated by 500 in FIG. 5a, the resulting horizontal sync pulses on conductor C are illustrated in FIG. 5c and the vertical sync pulses on conductor D are represented by 520 of FIG. 5d. At T516 as illustrated in FIG. 5, the vertical scanning interval ends and the vertical blanking interval begins. A first equalizing pulse interval ends and the vertical synchronizing pulse interval begins at time T522. Composite video signal 500 includes equalizing pulses at twice the horizontal rate in the interval T516-T522. During the vertical synchronizing pulse interval extending from T522 to a time between T3 and T4, vertical synchronizing pulses are separated by serrations which also recur at twice the horizontal frequency. The vertical synchronizing pulse interval is followed by a second equalizing pulse interval during which synchronizing pulses recur at twice the horizontal rate. This second equalizing pulse interval ends at time T9. From time T9 to a later time T28, composite video signal 500 includes horizontal-rate synchronizing pulses and the video signal is maintained at the blanking level. After time T28 and extending until the next following vertical blanking interval, the composite video signal includes information relating to the image to be displayed.

Sync separator 16 responds to composite video 500 and produces on conductor C a signal such as that illustrated by 515 in FIG. 5c. Before the beginning of the vertical blanking interval at time T516, horizontal-rate pulses are generated. During the two equalizing pulse intervals and during the vertical synchronizing pulse interval, double-rate equalizing pulses are produced. From time T9 until the end of the vertical blanking interval, and also during the next following vertical scanning interval, the separator once again produces horizontal-rate pulses. Sync separator 16 also responds to the vertical synchronizing pulse occurring in the interval T520 to T3. During this interval, an integrator (not shown) charges towards a threshold. At some time illustrated as time Ts in FIG. 5, separator 16 produces on conductor D a pulse illustrated as 520 in FIG. 5d.

The leading edge of pulse 520 is nominally the vertical synchronizing time. Since counter 425 and logic circuit 426 are clocked by the 2fH signal on conductor B, logic circuit 426 does not respond to pulse 520 until time T0, at which time the leading edge of a clock pulse 510 occurs. At time T0, logic circuit 426 responds to separated vertical sync pulse 520 and produces counter reset pulse 540 which resets counter 425 to zero and which also sets the output of FF 483 high, as illustrated by 570 of FIG. 5h. Resetting of the counter at time T0 causes a premature ending of the recurrent 8-count output of logic circuit 426 on conductor F, as illustrated in FIG. 5f. Thus, at time T0 the counter is reset in synchronism with the vertical synchronizing signal, and FF 483 is loaded with information in preparation for transfer to FF 484.

Counter 425 begins to accumulate counts during each successive leading edge of clock pulse 510 after being reset. At some time unrelated to the clocking and illustrated as time TT in FIG. 5, the separated vertical sync pulse ends. However, this has no effect on the counters or deflection circuits. At a time T8, the leading edge of a recurrent 8-count is applied by inverter 485 to clock FF 484 and transfer the logic 1 signal at its D input to the Q output, as illustrated by 580 of FIG. 5i. Pulse 580 is the loop filter control signal, which is amplified by drive circuit 470 and applied to transistor 458 to increase the speed of the PLL response. Thus, the PLL begins to respond quickly 8 clock counts after vertical sync triggering, which is a time near the end of the second equalizing pulse interval. This allows the PLL to respond rapidly to any phase error introduced either by loss of phase detector gain during the equalizing and synchronizing pulse intervals, to changes in phase attributable to the source of composite sync, or both.

At time T16, the recurrent 8-count output goes low, and a fully decoded 16-count signal illustrated as 560 in FIG. 5g is produced by logic circuit 426, as mentioned. Signal 560 resets Ff 483 by way of inverter 482 to a logic 0, preparatory to loading the logic 0 into FF 484. At a later time T24, recurrent 8-count signal 550 again goes high, clocking Ff 484 to store a logic 0 at the Q output. This removes drive as illustrated by 580 of FIG. 5i, and allows the loop filter to return to a short time constant low-speed operation necessary for noise filtering. Recurrent 8-count signal 550 continues to switch during the remainder of the vertical interval and clocks FF 484. However, reset signal 540 and 16-count signal 560 occur only once during each vertical counting cycle, and consequently the output stage of FF 483 does not change. Thus, continued clocking of FF 484 by recurrent 8-count 550 has no further effect on the PLL loop gain.

What is claimed is:

1. An improved television horizontal oscillator synchronizing arrangement for a television receiver adapted for use with a source of composite television signals including horizontal rate synchronizing signal portions and which also includes synchronizing pulses at twice the horizontal rate during a first portion of the vertical blanking interval, which first portion follows initiation of the vertical synchronizing pulse, the arrangement comprising:
   a synchronizing signal separator coupled to said signal source for receiving the composite television signals for producing first signals related to the horizontal rate;
   phase detection means including a first input terminal and an output terminal, and also including a second input terminal which is coupled to said synchronizing signal separator for receiving said first signals;
   controllable oscillator means for producing, at an output, second horizontal-rate signals, said oscillator means including a rate control input terminal;
   first coupling means for coupling said oscillator means output to said first input terminal of said phase detection means to apply said second signals thereto for producing at said output terminal of said phase detection means a pulsating control signal representative of the frequency and phase difference between said first signals and said second signals;
   controllable filter means coupled between said output terminal of said phase detection means and said rate control input terminal of said controllable oscillation means for closing a feedback phase-lock control loop for filtering said pulsating signals for applying said filtered signals to said controllable oscillator means, and maintaining said second signals in synchronism with said first signals, said controllable filter means also including a control input terminal by which the filter time constant can be varied; and
   filter time constant control means coupled to said control input terminal of said controllable filter means for changing said filter time constant at the vertical rate;
   wherein the improvement resides in that said filter time constant control means comprises timing means for inhibiting said filter time constant control means during at least a part of said first portion of said vertical blanking interval.

2. An arrangement according to claim 1 wherein said timing means further comprises a counter coupled to said controllable oscillator means and to said synchronizing signal separator for counting first and second successive intervals following initiation of a vertical synchronizing pulse, and for inhibiting said filter time constant control means during all but said second interval following a vertical synchronizing pulse.

3. An arrangement according to claim 2 wherein said timing means further comprises first and second flip-flops, said first flip-flop being coupled to said counter and to said second flip-flop for being set to a first state during said first interval following a vertical synchronizing pulse and for holding said set state during at least a portion of said second interval following a vertical synchronizing pulse.

4. An arrangement according to claim 3 wherein said second flip-flop is also coupled to said counter for receiving timing information therefrom for loading said second flip-flop at the beginning of said second interval following a vertical synchronizing pulse with the information coupled thereto from said first flip-flop, and for holding said information during said second interval following a vertical synchronizing pulse.

5. An arrangement according to claim 4 wherein said filter time constant control means is inhibited during said first interval following a vertical synchronizing pulse and wherein said filter is changed to a high-speed condition during said second interval following a vertical synchronizing pulse.

6. An arrangement according to claim 5 wherein said first interval following a vertical synchronizing pulse ends substantially concurrently with the end of the vertical equalizing interval, and wherein said second interval following a vertical synchronizing pulse comprises a portion of said vertical blanking interval other than said first portion of said vertical blanking interval.

7. A horizontal oscillator frequency control arrangement for synchronizing a horizontal oscillator with a source of horizontal synchronizing pulses which may have a change in phase occurring at the vertical deflection rate, and which also includes double-rate horizontal synchronizing pulses during equalizing pulse intervals which recur at said vertical deflection rate, comprising:

controllable horizontal rate oscillator means for producing horizontal rate oscillations the frequency and phase of which are controllable;

phase detection means coupled to said horizontal rate oscillator means and to the source of horizontal synchronizing pulses and responsive to said horizontal rate oscillations and to the horizontal synchronizing pulses for producing phase control signals representing the difference in frequency and phase therebetween;

controllable filter means coupled to said phase detection means and to said horizontal rate oscillator means and responsive to said phase control signals for producing an averaged signal for controlling said oscillator, said filter means having a variable frequency-amplitude characteristic;

a source of synchronizing signals at said vertical deflection rate;

control means responsive to said source of vertical rate synchronizing signals and coupled to said controllable filter means for recurrently varying said characteristic at the vertical rate; and delay means coupled to said control means and to said source of vertical rate synchronizing signals for delaying operation of said control means to a time substantially at the end of said equalizing pulse intervals.

8. An improved synchronizing arrangement by which a horizontal phase-lock loop (PLL) is synchronized with horizontal synchronizing portions of a composite video signal comprising:

means responsive to said composite video signal for separating a vertical synchronizing portion and said horizontal synchronizing portions from said composite video signal, said horizontal synchronizing portions including horizontal-rate sync signals and also including double-horizontal rate sync signals during portions of the vertical blanking interval;

a phase detector having a first input terminal coupled to said separating means for receiving said horizontal synchronizing portions, a second input terminal, and an output terminal;

a VCO including a rate control input terminal and a VCO output terminal at which a VCO signal is generated, said VCO output terminal being coupled to said second input terminal of said phase detector for producing at said output terminal of said phase detector a control signal representing the phase relationship between said horizontal synchronizing portions and said VCO signal; and a switchable time constant filter coupled to said phase detector output terminal and said VCO rate control input terminal for closing a PLL, said switchable filter also including a switch coupled to said separating means for switching said filter during said blanking interval, said switch maintaining said filter and said PLL in a low-speed condition for a time after initiation of said vertical synchronizing portion, and switching said filter and said PLL to a high-speed condition near the end of the double-horizontal rate sync signal portions of the vertical blanking interval following initiation of said vertical synchronizing portion.

9. A synchronizing arrangement for synchronizing a phase-lock loop with horizontal synchronizing signals of a composite video signal in a television receiver comprising:

means responsive to said composite video signal for separating vertical sync pulses, horizontal rate sync pulses, and equalizing pulses occurring at twice the horizontal rate during a portion of a vertical blanking interval, said horizontal rate sync pulses occurring during first and second time periods which are separated by said portion of said vertical blanking interval;

a controllable oscillator having a rate control input terminal and an output terminal at which a rate-controlled oscillator signal is produced;

a vertical count-down arrangement, including a counter and logic circuits, having a first input coupled to the output terminal of said controllable oscillator for counting periods of said rate-controlled signal, a second input coupled to said separating means for receiving said vertical sync pulses, a first output terminal which produces a first timing signal during a first state of said counter, a second output terminal which produces a second timing signal during a second state of said counter, and a third output terminal which produces a vertical deflection timing signal during a third state of said counter;

a vertical deflection circuit having an input coupled to said third output terminal of said vertical count-down arrangement for producing a vertical deflection signal in response to said vertical deflection timing signal;

a phase detector having a first input coupled to said oscillator output terminal for receiving said rate-controlled oscillator signal, a second input coupled to said separating means for receiving said separated horizontal sync and equalizing pulses, and an output terminal at which a control signal is produced which is representative of the phase relationship between said received signals at said inputs;

a switchable time constant filter coupled between said phase detector output terminal and said rate control input terminal of said oscillator for filtering and applying said control signal to said controllable oscillator, and including a time constant control input terminal for selecting one of a first predetermined time constant value for said filter and a second predetermined time constant value for said filter; and means, coupled between said first and second output terminals of said vertical count-down arrangement and said time constant control input terminal, for selecting said first time constant value in response to said first timing signal at a time which occurs within one horizontal line rate period of a plurality of successive ones of said horizontal rate sync pulses, and for selecting said second time constant value in response to said second timing signal at a time which occurs subsequent to said plurality of successive horizontal rate sync pulses and prior to the end of said vertical blanking interval.

* * * * *